June 10, 1941.        W. T. BROWN        2,245,324
METHOD OF MAKING BALLS
Filed Aug. 25, 1938

INVENTOR
WILLIAM T. BROWN
BY William T. Veyrer
ATTORNEY

Patented June 10, 1941

2,245,324

UNITED STATES PATENT OFFICE 2,245,324

METHOD OF MAKING BALLS

William T. Brown, Short Hills, N. J., assignor to A. G. Spalding & Bros. Inc., New York, N. Y., a corporation of Delaware Application August 25, 1938, Serial No. 226,733

11 Claims. (Cl. 154—16)

This invention relates to methods of making balls. More particularly, the invention relates to a factory preworked or "worn-in" ball such as used in tennis, hand ball or squash.

There is a strong preference among players, in tennis, squash-racket, hand ball and various sports using balls, and particularly those balls filled with gas under either light or considerable pressure, for a ball that is lively and does not change appreciably during use for a reasonable time. Heretofore it has not been possible to meet this requirement. In tennis, for example, the official regulations prescribe the properties of the ball, including initial compressibility. During use, a ball made to meet these requirements soon becomes somewhat soft or too compressible. For this reason, it is not uncommon in championship play for players to demand a dozen or more balls for use in a single match.

It is an object of this invention to provide an improved ball of the kind described that increases in compressibility during use at a lower rate than balls heretofore made for a given sport.

Figure 1:
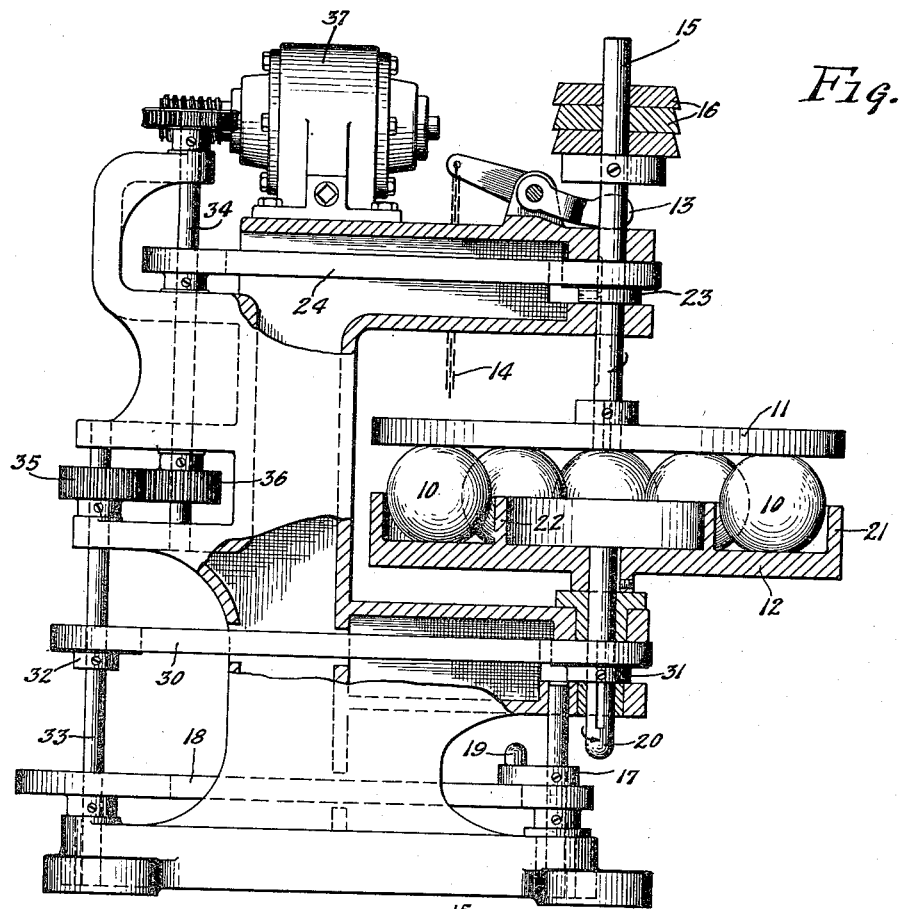
Figure 2:
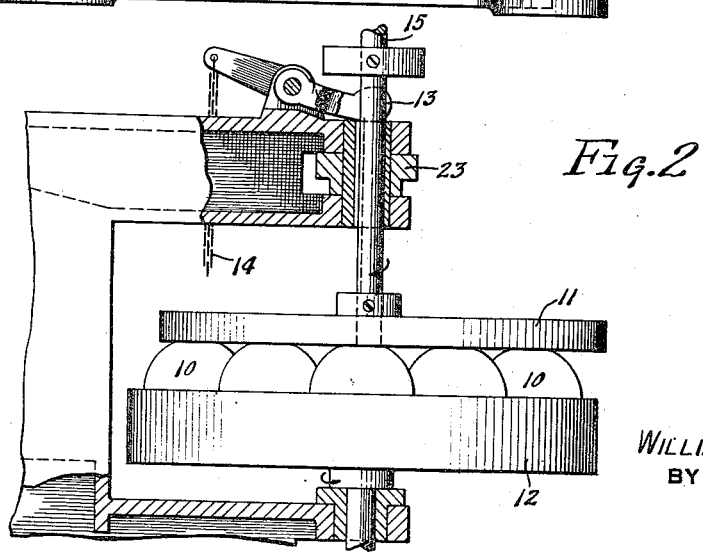

Further objects and advantages of the invention will be apparent as it is better understood by reference to the following specification and accompanying drawing, in which Figs. 1 and 2 are side elevations, partly in section, of machines for use in making the improved ball. Both of these figures are, in part, diagrammatic.

In general, I have found that a ball made in the usual manner and then subjected to working, that is, alternate compression and re-expansion, undergoes at first a relatively rapid change in hardness (as measured by compressibility) and then approaches the condition in which further working causes only a slight change.

The invention comprises conditioning a ball by preworking in order to bring it to a more or less stabilized condition as to hardness before the ball is used in play.

This preworking may be effected, for instance, in machines of the type shown, although it will be understood that the invention is not limited to any particular device for effecting the working of the ball.

It will be understood that the first steps in the making of the improved ball of the present invention include the formation of a sphere of resilient, rubbery material, such as rubber or Neoprene. Balls for some sports are hollow and inflated with gas under light or considerable pressure. In the case of the tennis ball, the resilient sphere is given a fibrous exterior coating, as with melton. Steps other than the preworking to which the ball is subjected are conventional, as are the machines used in the manufacture. However, according to the present invention the balls are made somewhat harder than desired for initial use, as by increased pressure of inflation within the ball and/or by increased hardness in the body material of the ball, the preworking being then continued until the hardness or compressibility becomes that specified in the regulations for new balls for the various sports. During play these preworked balls which were initially harder than standard or regular balls remain at the predetermined standards for a much longer time than regular balls do.

The improved balls of the present invention are made by subjecting the harder than standard balls to a kneading action, which in its simplest form is accomplished by rolling balls 10 between plate members 11 and 12 of the machine shown in Fig. 1 as by rotating plate 11 and/or 12 by means described hereinafter.

To subject the balls to a more rigorous working the plate members 11 and 12 are alternately moved towards and away from each other, so as to cause repeated alternate compression and re-expansion of the balls. Suitably the plates are moved so far apart, in the one stage of the oscillation, that the ball reassumes approximately it original shape, under the influence only of the prevailing atmospheric pressure.

The compression, with each movement of the plates toward each other, compresses the ball to a predetermined extent that can be controlled by the setting of the machine.

The machine may be provided with a lifter 13, activated by a chain or belt 14, passing around an eccentrically mounted pulley (not shown). The compressing force is the weight of the mechanism which includes the upper plate 11, the shaft 15, and weights 16 mounted thereupon.

To produce more sudden blows, there may be used the eccentrically mounted disc 17 rotated as by means of belt 18, and provided with upstanding knob or projection 19, which for each rotation of the disc 17, bumps against and lifts the rounded knob 20, thus forcing suddenly upward the lower plate 12.

Suitably, the plate 12 is provided with upstanding peripheral rim 21, which prevents the balls being worked from rolling from the plate. Also, if desired, the plate 12 may be provided with an inner upstanding ring 22, so that the balls being worked are confined in a circular race between the elements 21 and 22.

Preferably, the machine produces not only compression and re-expansion but also rolling of the balls. For this latter effect, the plate 11 is given a lateral movement, say, rotation, by means of the pulley 23 and suitable driving mechanism therefor including belt 24. Also, although it may take slightly longer to effect the desired degree of working it is possible to subject the balls to the rolling action alone.

In the machine shown in Fig. 2, there are used again, with the balls 10, the lifter 13, and upper and lower plate members 11 and 12. However, the upper plate is eccentrically mounted, so that there is oscillation of the plate not only up and down but also laterally while, at the same time, the plate is being rotated. Also, the up-and-down movement may be eliminated and just the rotatory or eccentric rotatory movement used alone.

In such machines tennis, squash racket, hand balls, or the like are subjected to the application of a compressive force, in turn, to various parts of the exterior surface of the balls, alternated with substantially complete release of the pressure between each application thereof.

With such conditioning, the balls come to have a minimized rate of change of hardness with further working or with use in play. For instance, I have found that a tennis ball subjected to repeated hitting against a hard surface for 25 minutes shows only approximately one-fifth as rapid a change in compressibility during the last ten minutes of this period as during the first fifteen minutes. Other tests confirm these results and show that the rate of change of compressibility of the ball decreases as the ball is manipulated. (Compressibility of a tennis ball or the like may be determined by the use of the machine described in British Patent No. 230,250, to Stevens.)

Depending in part upon the rate of oscillation of the compressing members, the time of working in machines of the kind illustrated may be varied, say, between 2 and 10 minutes. In any case, the degree to which the ball is compressed at any time is moderate but substantial, as, for example, slightly greater than caused by striking the ball in play.

The duration of and the extent of the pre-working will also vary somewhat with different balls. For any given ball, the working is continued for a substantial period of time, that is, until there is a minimized change in compressibility with further working, as for example, a change of compressibility per minute that is not more than a third of the change for the first minute of working.

It will be appreciated that the lower plate member 12 may also be rotated. When this is desired, it is preferably rotated in a direction opposite to the rotation of the plate member 11 by a belt 30 connected to pulleys 31 and 32, the latter through shafts 33 and 34 and the gear mechanisms 35 and 36 being connected to the electric motor 37. When it is desired to omit rotation of either the plate member 11 or 12, the belts 24 or 30 respectively are disconnected. Likewise, when it is desired to forego the impact action achieved with the lug 19 it is merely necessary to disconnect the belt 18.

The details given are for the purpose of illustration, not restriction, and variations within the spirit of the invention are intended to be included within the scope of the appended claims.

I claim:

1. In making and conditioning a resilient ball, the method which comprises making a ball harder than playing standard, and then rolling the ball under pressure until it meets playing standard.

2. In the mass production manufacture of gas-inflated balls, the process which comprises forming a hollow sphere of resilient rubbery material, inflating the sphere with gas under pressure to produce a ball less compressible than playing standard, compressing said ball to a predetermined substantial extent, and then allowing the ball to re-expand under atmospheric pressure, the compression and re-expansion being repeated in alternation, and the repetition thereof being continued until the ball meets playing standard.

3. In making a ball, the method which comprises forming a hollow sphere of resilient rubbery material and harder than playing standard, inflating the sphere with gas under pressure, and kneading the said sphere until it is within playing standard.

4. In the mass production manufacture of gas-inflated balls, the method which comprises forming a hollow sphere of resilient rubbery material, inflating the ball with gas under pressure, said forming and inflating providing a ball harder than standard, and repeatedly applying a rapidly intermittent compressing force, consisting of pressure applied in turn to various portions of the exterior of the sphere alternating with substantially complete release of pressure after each application thereof, said applications of pressure being applied substantially as soon as said ball has returned to substantially normal shape after said releases, said intermittent compressing force being applied until the ball meets playing standard.

5. In making a ball, the method which comprises forming a hollow sphere of resilient rubbery material and inflating the sphere with gas under pressure until it is harder than playing standard, and subjecting the sphere to compression and rolling until it is within playing standard.

6. In making a ball, the method which comprises forming a hollow sphere of resilient rubbery material harder than playing standard, and flexing the inflated sphere until further flexing for a substantial period of time produces a minimum of change in compressibility.

7. In the mass production manufacture of gas-inflated balls, the method which comprises forming a hollow sphere of resilient rubber material, inflating the sphere with gas to produce a ball less compressible than playing standard, and repeatedly subjecting the said sphere to a multiplicity of compressive blows of intensity at least approximately equal to those to which the ball will be subjected during use until the compressibility of the ball is increased to playing standard.

8. In making a play ball filled with compressed gas, the method which comprises making the ball of hardness substantially greater than desired for the initial use of the ball and then repeatedly compressing and reexpanding the ball until the hardness is reduced to that desired for initial use.

9. In making a play ball filled with compressed gas, the method which comprises making the ball of hardness substantially greater than desired for the initial use of the ball and then repeatedly compressing and reexpanding and rolling the ball until the hardness is reduced to that desired for initial use.

10. In making a play ball, the method which comprises making the ball of a hardness greater than that desired for playing use thereof, and rolling the ball until the hardness thereof is reduced to that desired for playing use.

11. In the mass production manufacture of balls, the method which consists in the steps of forming a hollow sphere of resilient material, inflating the sphere with gas under pressure greater than desired for normal play, and concurrently subjecting the ball to a rolling action and to a series of intermittent compressive blows, the intervals between the blows being of approximately the same duration as the blows, said rolling action and blows being continued until the compressibility of the ball is increased to meet playing standard.

WILLIAM T. BROWN.